July 27, 1954  W. D. REID  2,684,550
CASTING REEL
Filed Jan. 30, 1951  2 Sheets-Sheet 1
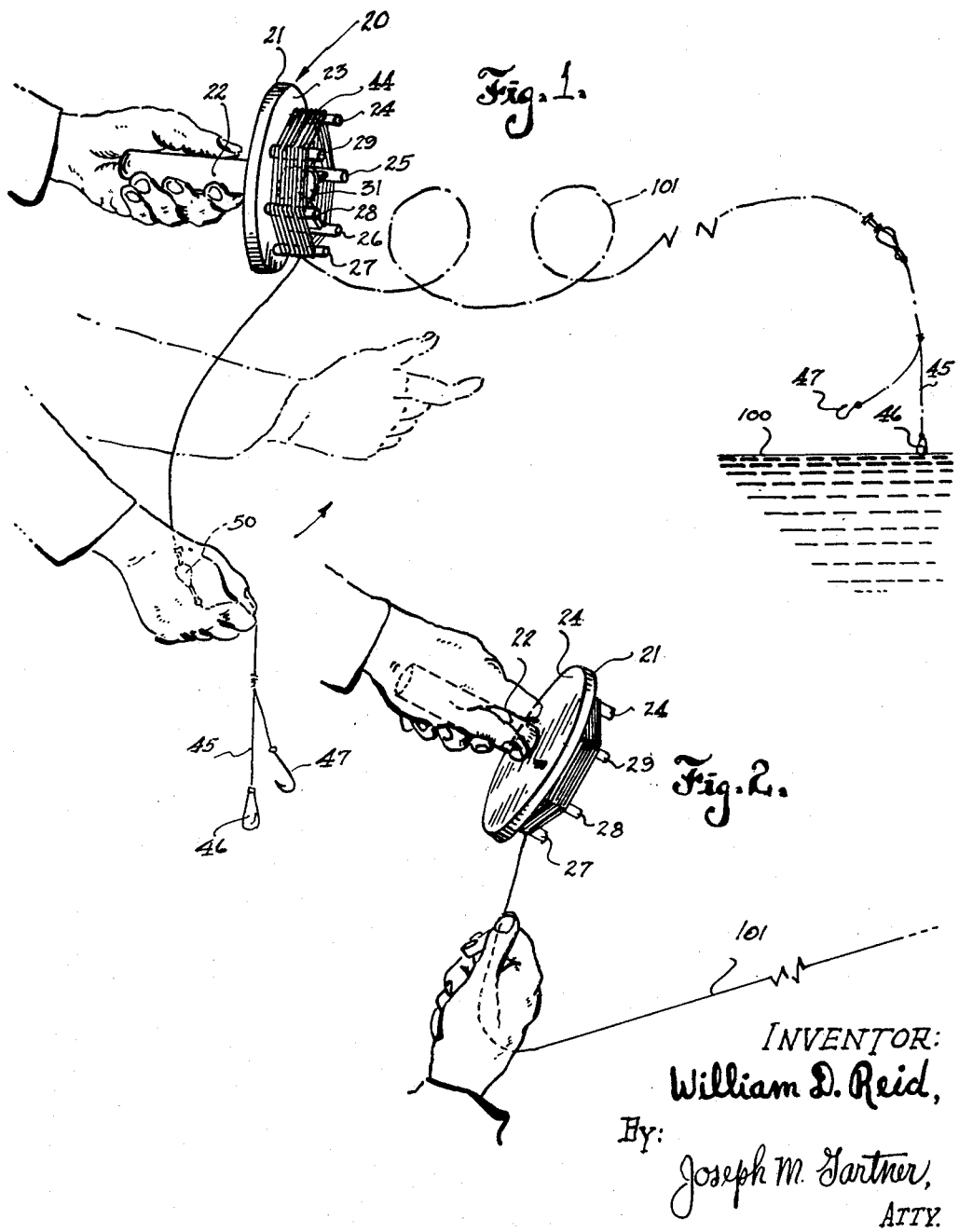
INVENTOR:
William D. Reid,
By:
Joseph M. Gartner,
ATTY.

July 27, 1954   W. D. REID   2,684,550
CASTING REEL
Filed Jan. 30, 1951   2 Sheets-Sheet 2
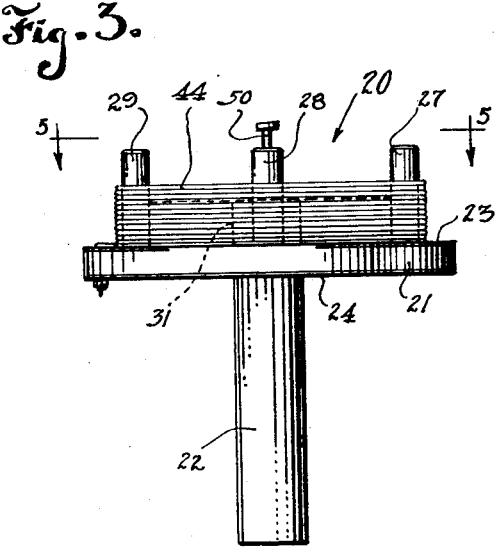
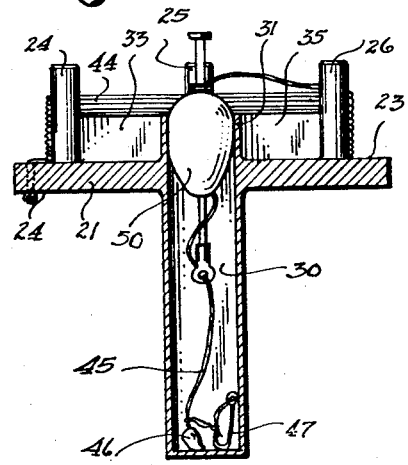
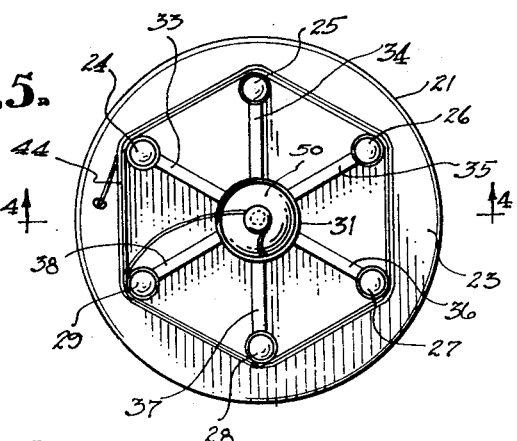
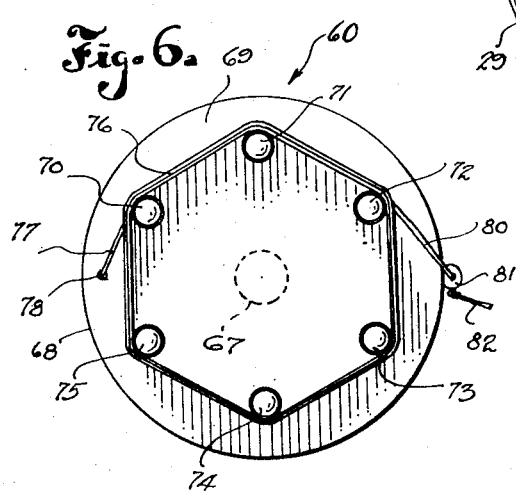
INVENTOR:
William D. Reid,
By
Joseph M. Gartner,
ATTY.

Patented July 27, 1954

2,684,550

UNITED STATES PATENT OFFICE 2,684,550

CASTING REEL

William D. Reid, Chicago, Ill.

Application January 30, 1951, Serial No. 208,535

3 Claims. (Cl. 43—27.4)

1

This invention relates, in general, to casting reels adapted to advantageous employment for fishing purposes.

The present trend in casting reels is to produce complicated and expensive casting reels with numerous working parts embodying precision machinery of expensive manufacture. Accordingly, it is an important object and accomplishment of the invention to provide a casting reel having no moving parts and utilizing a normal underhand or casting motion of the hand or arm for accomplishing the casting operation.

Otherwise stated, the invention is embodied in a casting reel of the above described character having integral handle and reel means with no moving parts.

More specifically stated, it is a particular object and accomplishment of the invention to provide a casting reel having a number of winding pegs radially spaced on the casting reel body and upon which the fishing line may be wound, the said winding pegs being so positioned on the winding reel element as to allow the fishing line to unwind itself when cast and to permit quick and easy rewinding thereof, said casting reel body also having means defining a storage chamber for the purpose of accommodating a bobber and to protect the sinker and hook.

Another object and accomplishment of the invention is to provide a casting reel that is so simply designed as to permit economical production in large quantities.

An ancillary object and accomplishment of the invention is to provide a new and improved casting reel which is adapted to be economically manufactured and which is so designed as to permit the manufacture and assembly thereof in accordance with present day large scale mass-production manufacturing methods of construction and assembly.

The invention seeks as a further object and accomplishment, to provide a casting reel particularly characterized by a design arrangement to more advantageously and satisfactorily perform the functions required of it and adapted to provide a compact unit which will successfully combine the factors of structural simplicity and durability and yet be economical to manufacture.

Additional objects and features and advantages of the invention disclosed herein will be apparent to persons skilled in the art after the operation and construction thereof are understood from the within description.

It is preferred to accomplish the various objects of this invention and to practice the same as hereinafter more fully described and as more particularly pointed out in the appended claims. Embodiments of the invention are illustrated in the accompanying drawings which form a part hereof and wherein:

Fig. 1 is a perspective view of the casting reel embodying the features of the present invention and illustrated as being held in one hand while the other hand performs the casting operation;

Fig. 2 is a perspective view of the casting reel depicted in Fig. 1 and illustrating the rewinding of the fishing line thereon;

Fig. 3 is a side view of the casting reel depicted in Fig. 1 with the fishing line wound upon the winding pegs;

Fig. 4 is a sectional view of the casting reel depicted in Fig. 3 and illustrating the relative disposition of the parts when the bobber, sinker and hook are in their storage position, this view being taken substantially on the plane of the line 4—4 in Fig. 5;

Fig. 5 is a top view of the casting reel depicted in Fig. 3 and being taken substantially on the plane of the line 5—5 in Fig. 3; and Fig. 6 is a top view of a modified form of casting reel contemplated by this invention.

The drawings are to be understood as being more or less a schematic character for the purpose of illustrating and disclosing typical and preferred forms of the improvements contemplated herein and in the drawings like reference characters identify the same parts in the several views.

In the exemplary embodiment of the invention depicted in Figs. 1, 2, 3, 4, and 5, the casting reel is indicated in its entirety by the numeral 20 and comprises, in general, a substantially circular shaped disc 21 having integrally formed therewith and projecting downwardly therefrom a handle 22, said disc having a top surface 23 and a bottom surface 24; a plurality of radially spaced winding peg elements respectively indicated at 24, 25, 26, 27, 28, and 29, said winding peg elements being integrally formed with and projecting outwardly from the top surface 23 of the disc 21; said handle 22 being of hollow construction to define a storage chamber 30 and having portions 31 projecting upwardly and outwardly of the top surface 23; and reenforcing web-like elements 33, 34, 35, 36, 37, and 38 respectively disposed and in interconnecting relationship between the winding peg elements and the projecting portion 31 of the handle 22 forming therebetween recesses adapted to house hooks and sinkers when the handle is held substantially upright.

The reeled portion 44 of a fishing line is wound upon the winding pegs and the free end 45 (Fig. 1) of the reeled fishing line 44 has a weight 46 attached thereto and one or more fishing hooks 47 may be secured in the customary manner near the free end 45 of the fishing line. A suitable bobber as at 50 may be strung into the fishing line adjacent the free end thereof as shown in Figs. 1 and 4.

Attention is now invited to Fig. 4 which is a sectional view of the casting reel 20 and illustrates the relative disposition of the parts thereof when the bobber, sinker, or weight 46 and fishing hook 47 are in their storage position within the chamber 30 defined by the handle 22. The positioning of the bobber 50 in the manner illustrated provides a means of protection of the sinker or weight 46 and the hook 47.

Moreover, it is apparent that the placement of the bobber 50 in the projecting portion 31 will provide a water-tight and air-tight seal to the chamber 30. This is important in that the entire reel assembly will float upon the surface of the water in the event that the reel is inadvertently dropped in the water. In this connection, it is also notable that when the bobber is removed from its position as shown in Fig. 4, and is in the casting position as shown in Fig. 1, the reel body will also float upon the surface of the water in the event that it is inadvertently dropped therein because the weight is in the upper regions of the body, and when dropped, the body will fall downwardly with the handle projecting upwardly and when in the water there will be provided an airlock to cause the reel body to float upon the surface of the water where it may be retrieved.

It is apparent that when the elements are disposed in their storage position as shown in Fig. 4, the entire device is compact and may be safely disposed in the glove compartment of an automobile or may be carried in a suitcase or the like and requires very little space. Moreover, the instant reel construction is safe in that the hook and other elements are confined within the storage chamber to protect the hands of the user and any other articles which may be disposed adjacent to the reel or come in contact therewith.

Attention is now directed to Fig. 6 wherein there is illustrated a modified form of casting reel contemplated by this invention and designated in its entirety by the numeral 60, said casting reel 60 consisting of a handle element 67 rigidly attached to a reel disc 68 having on its top surface 69 a plurality of radially spaced winding peg elements 70, 71, 72, 73, 74, and 75, upon which the reeled portion 76 of a fishing line is wound and the attaching end portion thereof 77 is secured by its knotted end 78 to the disc 68 adjacent the periphery thereof. The free end 80 of the reeled fishing line 76 has a weight 81 and one or more fish-hooks 82 may be secured thereto in the customary manner.

A review of the modified form of casting reel illustrated in Fig. 6 will disclose that the same is very similar to that shown in Fig. 3 with the exception that the storage chamber 30 for the bobber, sinker and fish-hook is eliminated. Otherwise, the operation and function of the casting reel 60 is the same as that of the casting reel 20.

The casting reels 20 and 60 may be molded in one piece of plastic in any of the attractive colors or may be rigidly assembled of wood or light satisfactory metal.

To use the casting reel 20, the bobber 50 is removed from its storage position as illustrated in Fig. 4 and the free end 45 of the fishing line is held in one hand as illustrated in Fig. 1 while the casting reel 20 is held by the handle element 22 in the other hand. The free end 45 of the fishing line is cast by a natural underhand casting motion as is shown by the dotted lines in Fig. 1 so that the free end 45 together with the weight 46 and the fish-hook 47 will land wherever thrown in the water 100.

In Fig. 2, there is clearly illustrated the manner by which a cast line 101 is withdrawn from the water and rewound on the winding peg elements of the reel 20. If preferred, the handle element 22 may be fixedly clamped to a railing or boat gunwale, leaving one hand free as the other hand performs the casting operation.

The very important advantage of the invention resides in the simplicity of its construction which permits a free and natural casting motion of the casting hand, and since the casting reel is held pointed in the direction of the cast, the line is free to unwind without mechanical restraint and without the snagging of the line usually present in the prior art casting reels employing elaborate mechanical winding devices.

After the fishing operation is completed, the bobber 50, the sinker 46, and the hook 47 may be replaced in the storage chamber 30 as illustrated in Fig. 4 whereupon the reel 20 may be stored away safely until its next use.

The modified reel 60 operates in the same manner as hereinbefore described with respect to the reel 20 with the exception that no storage space is provided for the bobber or the weight 81 or the fish-hook 82.

Another important advantage of the invention is the extremely simple design affording a very inexpensive reel which, furthermore, is of such simple operation that a novice or child can operate it safely with satisfactory results.

The instant casting reel, being formed of simple parts and readily available materials, lends itself to mass-production manufacturing principles, thus affording a substantial saving in the manufacturing costs.

From the disclosure, it may be observed that I have provided an improved casting reel incorporating an improved casting action which efficiently fulfills the objects thereof as hereinbefore stated and which provides numerous advantages which may be summarized as follows:

1. Structurally simple, efficient and durable;
2. Economical to manufacture and readily adaptable to mass-production manufacturing principles; and
3. The provision of a casting reel having no moving parts and utilizing a normal underhand or casting motion of the hand or arm for accomplishing the casting operation.

Although I have herein described rather succinctly the nature and use of the invention so that persons skilled in the art will have no difficulty apprising themselves of the teachings thereof and, inasmuch as the disclosure is susceptible of various alterations, modifications and improvements, I hereby reserve the right to all such modifications, alterations, and improvements falling within the spirit of my invention and the scope of the appended claims.

Having thus described and revealed my invention what I claim as new and desire to secure by Letters Patent is:

1. A unitary molded fishing casting reel comprising: a hollow tubular shaped handle adapted as a hand grip for the user and defining the longitudinal axis of the reel, one end of said tubular handle being open and the other end being closed, a generally circular shaped plate-like body projecting from said handle, said body being disposed adjacent the open end of said tubular handle and having a surface in a plane disposed at right angles to the longitudinal axis of said reel, peg-like elements in an annular array adjacent the periphery of said plate-like body with the longitudinal axis of each peg-like element being parallel to the longitudinal axis of said reel and radially equally spaced from said axis, and web-like ribs extending between the pegs and the tubular handle forming therewith recesses adapted to house hooks and sinkers when the handle is held substantially upright.

2. A fishing casting reel in accordance with claim 1 wherein said handle is hollow substantially throughout its extent to retain fishing devices therein.

3. In a fishing device a unitary molded fishing casting reel comprising, a hollow tubular shaped handle adapted as a hand grip for the user and defining the longitudinal axis of the reel, one end of said tubular handle being open and the other end being closed, a generally circular shaped plate-like body projecting from said handle, said body being disposed adjacent the open end of said tubular handle and having a surface in a plane disposed at right angles to the longitudinal axis of said reel, peg-like elements in an annular array adjacent the periphery of said plate-like body with the longitudinal axis of each peg-like element being parallel to the longitudinal axis of said reel and radially equally spaced from said axis, web-like ribs extending between the pegs and the tubular handle forming therewith recesses adapted to house hooks and sinkers when the handle is held substantially upright, and a float of greater length than width, the maximum cross-sectional diameter in the direction of its width corresponding substantially to the inner diameter of the hollow handle whereby the float may be retained in contact with the inner wall of said handle solely by friction.

References Cited in the file of this patent

UNITED STATES PATENTS

| Number | Name | Date |
|---|---|---|
| 605,607 | Koch | June 14, 1898 |
| 941,637 | Jameson | Nov. 30, 1909 |
| 980,682 | Saracco | Jan. 3, 1911 |
| 1,625,988 | Dice | Apr. 26, 1927 |
| 1,933,163 | Coplen | Oct. 31, 1933 |
| 2,052,262 | Walberg | Aug. 25, 1936 |
| 2,465,744 | Olender | Mar. 29, 1949 |
| 2,531,806 | Coughlin | Nov. 28, 1950 |
| 2,537,613 | Allen | Jan. 9, 1951 |

FOREIGN PATENTS

| Number | Country | Date |
|---|---|---|
| 12,728 | Australia | June 29, 1934 |
| 34,021 | Sweden | Dec. 18, 1912 |
| 89,163 | Germany | Nov. 5, 1896 |